Figure 1:
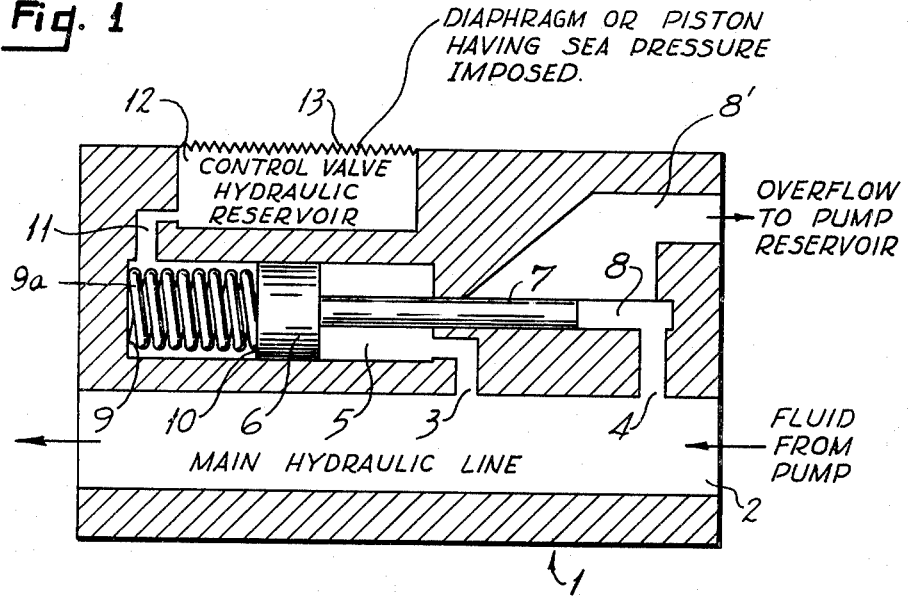

Oct. 12, 1965   G. K. FRASER   3,211,176

PRESSURE CONTROL SYSTEM

Filed Sept. 11, 1963

INVENTOR.
G. K. FRASER

United States Patent Office 3,211,176
Patented Oct. 12, 1965

3,211,176
PRESSURE CONTROL SYSTEM
George K. Fraser, West Caldwell, N.J., assignor to Vare Industries, Inc., Roselle, N.J., a corporation of Delaware
Filed Sept. 11, 1963, Ser. No. 308,165
4 Claims. (Cl. 137—494)

This invention relates to a pressure control system and is particularly directed to a hydraulic pressure control valve system whereby pressure differentials therein can be maintained constant in relation to the ambient pressures surrounding the said system.

Hydraulic systems operating in air have a certain amount of pressure in their lines and the seals which prevent the hydraulic fluid from leaking out around the pistons are designed to hold the pressure that is inside that system. If there were an increase in pressure inside the hydraulic system to enable it to operate at deep depths in the sea, as for example 20,000 feet down, or some 10,000 pounds per square inch of pressure, it becomes obvious that the pressure inside the hydraulic system must be above this figure. Hence, if a hydraulic system were designed so that the seals were sufficiently strong to hold back pressures of 10,000 pounds per square inch and more, these seals of necessity would be very expensive to obtain and would be tricky to install and their reliability would not be so great as those which have been proven for lower pressures.

To obviate these limitations, a valve system is to be created whereby the pressure inside the hydraulic system will be a constant amount above the pressure in the outside medium regardless of the depth at which the system is required to work, as the said system is lowered to different depths in a fluid medium and particularly in the ocean. This is accomplished by producing a valve wherein the pressure differential between the main hydraulic line and depth remains fixed, and whenever this differential is changed, a special bleed-off system of valves is used as to create a smaller or larger feed-back of fluid to a main reservoir thereby increasing or decreasing the fluid pressure in the line. In other words, a greater flow back to the reservoir of fluid causes a reduction in line pressure, whereas a smaller feed back to the reservoir results in a greater pressure in the hydraulic line.

It is therefore a principal object of the invention to produce an improved hydraulic pressure control system.

Another object of the invention is to produce a hydraulic control system which does not require high cost, high pressure seals.

Another object of the invention is to provide a hydraulic system capable of operating in air or at any ocean depth without requiring high cost or heavy weight pumps, valves, lines or fittings.

Another object of the invention is to provide a hydraulic system which provides the same operational speed, forces and response characteristics, whether in air or in the ocean at any depth, for effecting proper pressure differential control.

Another object of the invention is to provide a hydraulic system which can function and operate at varying depths without the necessity of changing, altering, or modifying the seals and lines as a result of such changing depths.

A still further object of the system is to produce a hydraulic pressure control system which maintains a constant pressure differential between the inside of the system and the ambient surroundings thereto irrespective of the depths to which the said system functions or operates.

Other objects and advantages will become apparent from a reading of the specifications and a study of the accompanying drawings, and wherein FIGURE 1 is a hydraulic pressure control valve diagram according to the invention.

Figure 2:
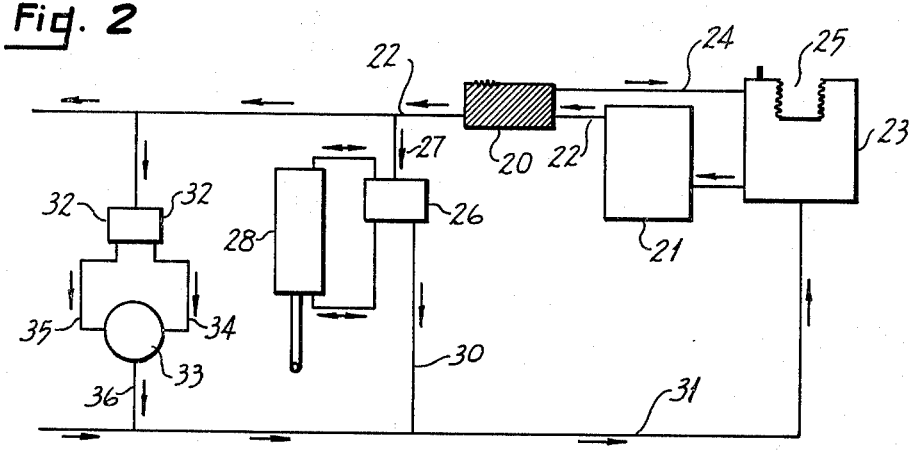

FIGURE 2 is a hydraulic pressure system wherein the invention is used.

Now to describe the invention, particularly with respect to FIGURE 1, there is shown a hydraulic pressure control system comprising a control valve enclosure 1 having a main passage or conduit 2, which is the main hydraulic line for fluid flow, and a pair of auxiliary passages 3 and 4 spaced intermediate one extremity of the main passage and in communication therewith. Auxiliary passage 3 flows into control cylinder 5 within the said enclosure, the said cylinder having there within a displacement reciprocating type piston 6 to which is attached piston rod 7 disposed to traverse passageway 8 during displacement of the piston. The passage 8 further terminates within and communicates with the passage 4 previously mentioned and through a slotted metering port to another passage 8' which terminates in a pump reservoir, not shown. This said hydraulic pump reservoir from which fluid is supplied to the pump is so arranged that it has imposed upon it the pressure of the outside medium by means of a diaphragm distensible membrane or piston responsive to pressure movements of the outside ambient media. The portion of the cylinder 5 opposite the piston rod has residing therein a pressure-type coil spring 9a whose extremities continually bear against the end wall 9 of the cylinder and the face or surface 10 of the piston 6. The cylinder space portion wherein the coil spring resides has communicating therewith a passage 11 which terminates in and communicates with recess or oil-filled reservoir 12 having at the upper extremity thereof a closure consisting of distensible membrane, piston or diaphragm 13 responsive to pressure movements of outside or ambient surrounding media.

In operation, where the enclosure descends to some particular depth, the ambient seat pressure exerts a definite pressure on the membrane 13 which thereby exerts a similar pressure on the piston 6 through the forced flow of the hydraulic fluid residing within the reservoir 12 through the passage 11 to the previously described end of cylinder 5. The coil spring also exerts a certain pressure against the piston 6 so that the combined forces due to the ambient media and the spring tends to mobilize the piston in a direction opposite to the force on the piston exerted by the main hydraulic line 2 through the passage 3 which terminates in the other end of cylinder 5. When these combined opposing forces are in equilibrium, regardless of the ambient or outside pressure, there will be a definitely established pressure differential between the inside of the main hydraulic line 2 and the outside or ambient pressure. The pressure of the coil spring is in effect the pressure by which the hydraulic main line or system exceeds the surrounding sea pressure, and this pressure remains substantially constant, hence the advantage in not having to provide high pressure-type seals.

Now when the differential between ambient and line differs from the pre-selected amount, an equalizing mechanism will go into effect. Hence, when the ambient or sea-pressure is greater, the piston 6 will be driven in a direction which causes the piston rod or plunger 7 to traverse the passage or chamber 8 so as to restrict the flow of fluid through the exit port/passage or throttle valve 8' coming from the main hydraulic line 2 through passage 4. Restriction of the fluid flow through port 8' results in less flow to the pump reservoir which then permits the pump to exert more pressure on the system thereby increasing the main hydraulic line pressure and therefore more fluid pressure through the passage 3 and ultimately to the piston 5 thus equalizing the forces on the piston 6 and restoring the state of equilibrium between ambient and system pressures. In the event the equilibrium is disturbed in the opposite direction, that is where the hydraulic line pressure is greater than the pre-set pressure differential between ambient and the internal system, then the piston will be forced back against the pressure of the coil spring, and the plunger 7 will expose a larger portion of the exit port or throttle valve 8' so as to increase the fluid flow back to the pump reservoir thereby decreasing the pressure action of the pump and the main hydraulic line.

The above manner of operation makes use of a pump for operating the hydraulic system which requires considerably lower power than would be necessary if there were instead a constant pressure system set to operate for the greatest depth to which the hydraulic system were to operate.

FIGURE 2 shows an overall typical system wherein the control valve functions to maintain the desired pressure differential. In particular, the control valve 20 is connected to pump 21 through the main hydraulic line 22 and is connected back to the fluid reservoir 23 through the feed-back line 24. The reservoir has associated therewith the diaphragm 25, previously described. The main hydraulic line 22 is connected to a number of hydraulic devices, each performing different functions. For example, a control valve takes adjusted fluid pressure from the main line via connecting line 27 and on signal introduces it to one or the other end of a typical hydraulic cylinder 28 to actuate its piston and thereafter exhausting fluid from its idle end via line 30 and back to the reservoir 23 via exhaust line 31. Another example shows control valve 32 connected to main line 22, which is used in conjunction with hydraulic motor 33, transmitting to the said motor fluid via lines 34 or 35, depending upon which direction the motor is to operate, the motor then exhausting the hydraulic fluid via line to the exhaust line 31 and again back to the reservoir.

It may be appreciated that certain changes and modifications may be made in the overall hydraulic system, as embodied herein, without detracting in any way with the true purpose and intent of the invention.

Having defined the invention, what is claimed is:

1. A hydraulic control valve for controlling the pressure in a hydraulic system to maintain a constant differential of pressure between an ambient media and said hydraulic system comprising;
   (a) an enclosure having a main fluid passage, a pair of auxiliary passages spaced intermediate of said main passage and in communication therewith,
   (b) the enclosure further including a piston chamber with a piston slidable therein and coaxial therewith a rod chamber having a piston rod slidable therein which is connected to said piston,
   (c) a metering slot formed in said enclosure cooperating with said piston rod for variably communicating said rod chamber with an additional passage in said enclosure,
   (d) pressure means within said piston chamber and disposed to exert a pre-selected force against said piston for urging said piston rod to a position covering said metering slot,
   (e) a fluid filled reservoir in said enclosure in communication with said piston chamber and having a pressure sensitive member exposed to the ambient media to urge said piston rod to a position covering said metering slot whenever said ambient pressure and system pressure differ by a preselected amount determined by said pressure means,
   (f) one of said auxiliary passages communicating the pressure in said main fluid passage to said piston chamber to act on said piston in opposition to said pressure means and said other auxiliary passage communicating with said rod chamber whereby said piston rod and metering slot are operative to maintain a constant differential between said main passage and ambient media.

2. A hydraulic control system according to claim 1 and wherein the said pressure sensitive member is a distensible diaphragm.

3. A hydraulic control system according to claim 1 and wherein said pressure means includes a compressive member responsive to piston movements with the said piston chamber.

4. A hydraulic control system according to claim 3 and wherein the said compressive member is a coil spring.

References Cited by the Examiner

UNITED STATES PATENTS

| | | | |
|---|---|---|---|
| 2,326,825 | 8/43 | Bucknam | 137—81 |
| 2,890,715 | 6/59 | Ebersold | 137—494 |
| 3,105,515 | 10/63 | Webb et al. | 251—57 X |

MARTIN P. SCHWADRON, *Acting Primary Examiner.*

M. CARY NELSON, *Examiner.*